2,853,522

PROCESS OF PREPARING 2,2'-DIHYDROXY-4,4'-DIALKOXYBENZOPHENONES

Jason E. Dayan, Albany, and Stiles M. Roberts, Loudonville, N. Y., assignors to General Aniline & Film Corporation, New York, N. Y., a corporation of Delaware No Drawing. Application June 22, 1956
Serial No. 593,021

6 Claims. (Cl. 260—591)

This invention relates to 2,2'-dihydroxy-4,4'-dialkoxybenzophenones, and particularly to an improved process of preparing the same.

It is known that 2,2'-dihydroxy-4,4'-dialkoxybenzophenones are utilized as absorbents for ultraviolet light in various transparent sheet materials and for the stabilization of transparent plastics. When such compounds are utilized as ultraviolet absorbers in materials, such as plastics, resins, film forming materials, including colored textiles, and the like, it is extremely important that the compounds be of the highest degree of purity and stability upon storage.

The 2,2'-dihydroxy - 4,4' - dialkoxybenzophenones are usually prepared by condensing a resorcinol dialkyl ether with a carbonylating agent, such as phosgene, in the presence of aluminum chloride. As a specific example, U. S. P. 2,693,492 describes the production of 2,2'-dihydroxy-4,4'-dialkoxybenzophenones by condensing 2 moles resorcinol dialkyl ether with 1 mole phosgene in the presence of 2 moles aluminum chloride in the presence of an inert solvent-diluent at a temperature ranging between 4° and 55° C., decomposing the aluminum chloride complex with ice and hydrochloric acid, separating the organic layer and extracting it with caustic alkali, and acidifying to obtain the desired benzophenone. Subsequent crystallizations yield the final product.

The principal shortcoming of the foregoing procedure is that aluminum chloride alone is too reactive as a de-alkylating agent, as a result of which the desired di-dealkylated product is always contaminated with the mono-, tri- and completely de-alkylated products, as well as other decomposition products. Inasmuch as it is essential for certain uses, such as ultraviolet absorbents for colorless organic film-forming plactics, resins, gums, waxes, etc., to utilize 2,2'-dihydroxy-4,4'-dialkoxybenzophenone of the highest purity, the presently available processes are incapable of yielding directly the said benzophenones in a high degree of purity.

We have discovered that the foregoing commercial procedure can be improved decidedly to yield 2,2'-dihydroxy-4,4'-dialkoxybenzophenone of a high degree of purity and free from contaminants of the aforementioned type by replacing the aluminum chloride with a mixture of an alkali metal halide and aluminum chloride as the condensation and de-alkylating reagent.

By employing such a mixture the activity of the aluminum chloride is so regulated that the carbonylation occurs in an easy manner and when the condensation product is warmed in order to de-alkylate, control of the reaction is facilitated. As a result the di-de-alkylated product is produced in high degree of purity, in a good yield, and virtually free from contaminants. In general, the product is lighter in color and can be dried more readily to give a good pulverulent product. It also has a somewhat lower solubility in hydrocarbon solvents.

Accordingly, it is an object of the present invention to provide an improved process of preparing 2,2'-dihydroxy-4,4'-dialkoxybenzophenones.

Other objects and advantages will become manifest from the following description:

The process involved in obtaining the foregoing compounds is carried out by first preparing the condensing and de-alkylating reagent which consists of the following:

2 component mixture

| Sodium Halide, percent by weight | Aluminum Chloride, percent by weight |
|---|---|
| 15-40 | 60-85 |

3 component mixture

| Sodium alide, percent by weight | Potassium Halide, percent by weight | Aluminum Chloride, percent by weight |
|---|---|---|
| 5-16 | 5-25 | 59-90 |

The two-component or three-component mixture may be used as such by merely mixing it in a suitable solvent-diluent or in lieu thereof, the two-component or the three-component mixture may be first mixed and heated with stirring to a sufficiently high temperature to produce a melt. Usually a temperature of 110° C. is sufficient to heat the mixture, whereupon it continues to warm up from internal heat of reaction to 150°–160° C. The resulting melt, after cooling, is readily soluble or dispersible in the inert solvent-diluent. Other variations of employing the mixtures will become evident from the working examples.

The sodium halide in the two-component and three-component mixtures consists of sodium chloride, sodium bromide or sodium iodide, and the potassium halide in the three-component mixture consists of potassium chloride, potassium bromide or potassium iodide. When the two- and three-component mixtures are employed, the amount to be utilized ranges from 140–215 parts by weight per 100–180 parts by weight of a 1,3-dialkoxybenzene.

With the condensing and de-alkylating reagent prepared, the second step in the process consists of dissolving a 1,3-dialkoxybenzene such as 1,3-dimethoxybenzene, 1,3-diethoxybenzene, 1,3 - diisopropoxybenzene, 1,3 - di - n - butoxybenzene, and 1,3-diisoamyloxybenzene, and the like, in an inert solvent-diluent such as for example, nitrobenzene, carbon disulfide, ethylene dichloride, 1,1,1-trichloroethane, 1,1,2-trichloroethane, 1,3-dichloropropane, carbon tetrachloride, etc. The solution is cooled to at least 0° C. and not higher than 10° C. From 140–215 parts by weight of the two-component or three-component mixture per 100 parts by weight of a 1,3-dialkoxybenzene are added with stirring, and the temperature maintained at 0°–10° C. Through this mixture a steady stream of phosgene is passed, preferably at a temperature of 0°–5° C. The amount of phosgene employed is preferably in excess of the molecularly equivalent amount and may range up to 150% in excess so as to compensate for the loss during the reaction. After one hour the temperature is slowly raised and held between 45° and 85° C., preferably at about 65°–70° C., for sufficient time for di-de-alkylation to occur, i. e. between 5 and 24 hours. The resulting solution is decomposed with an acidic ice water mixture maintained below 10° C. At this point an additional quantity of an inert solvent-diluent is added to dissolve the product. It may be warmed in order to effect better solution, for example, up to 70° C. The oil layer is separated, extracted with dilute aqueous sodium hydroxide or any other suitable caustic alkali. The basic solution, after the removal of the residual solvent-diluent and acidification, e. g. with hydrochloric acid, while maintaining a low temperature, e. g. below about 10° C., yields a light tan solid which is filtered, washed with cold water until salt free and dried. The product has a high degree of purity, is virtually free from contaminants. It is obtained in good yield and may be further purified by recrystallization if desired.

The following examples will illustrate the improved process. All the parts given are by weight unless otherwise noted.

EXAMPLE I

A three-component mixture of the condensing and de-alkylating reagent was prepared by mixing together 20 grams of sodium chloride, 17.5 grams of potassium chloride, and 140 grams of aluminum chloride to yield a mixture weighing 177.5 grams. The mixture was heated to about 110° C., whereupon the temperature continued rising to about 150° C. under constant agitation. The melt was cooled to 80° C. and 480 cc. of ethylene dichloride added. A substantial portion of the melt went into solution. The mixture was cooled to 0° C. 100 grams of 1,3-dimethoxybenzene were added while maintaining the solution at 0°–5° C. At this point phosgene gas, approximately 42 grams, was passed through the solution while maintaining the same temperature, and then the batch was slowly rasied to 67° C. in a period of about 4 hours and held at approximately that temperature for 16 hours. It was cooled to 0° C. and drowned in a mixture of 360 cc. of water, 360 grams of ice, and 60 cc. of 21° Bé. hydrochloric acid. Extra ice was added to keep the temperature below 10° C. Approximately 500 cc. of ethylene dichloride were added and the whole heated to 55–60° C. until solution of the organic material was complete. The oil layer was separated and to it was added 800 cc. of cold water and 83 cc. of a 33% by weight caustic soda solution. The mixture was stirred for 15 minutes and the lower ethylene dichloride layer separated. The solution was clarified, and the filtrate was added to 96 cc. of 21° Bé. hydrochloric acid and 600 cc. of ice water while maintaining the temperature below 10° C. The charge was filtered, washed with cold water until salt free and then dried. A yield of approximately 65 grams (65% of theory) of a light tan product was obtained which had a melting point of 135.1°–136° C.

The proportions of the salts used in the melt in the foregoing example are as follows:

| | Percent |
|---|---|
| Sodium chloride | 11 |
| Potassium chloride | 10 |
| Aluminum chloride | 79 |

EXAMPLE II

To 480 cc. of ethylene dichloride, 20 grams of sodium chloride, 17.5 grams of potassium chloride and 140 grams of aluminum chloride were added and the mixture stirred for one hour, after which 100 grams of 1,3-dimethoxybenzene were added at 0°–5° C. While maintaining the charge at this temperature, 42 grams of phosgene gas were passed through after which the temperature was slowly raised to about 67° C. and maintained there for a period of 16 hours. At this point, the reaction mass was treated as in Example I to yield 59 grams (59% of theory) of a product having a melting point of 133.4°–137° C. The proportions of the salts used in the condensing and de-alkylating reagent mixture were the same as in Example I.

EXAMPLE III

To 400 cc. of ethylene dichloride at room temperature were added 28.2 grams of sodium bromide, 17.5 grams of potassium chloride and 140 grams of aluminum chloride. The charge was stirred for 30 minutes, then cooled to 0° C. 100 grams of 1,3-dimethoxybenzene were added at 0° C. and stirred well. At 0° C. 41 grams of phosgene gas were passed through the solution. The temperature was gradually raised and maintained at 67° C. for a period of 16 hours. The batch was then finished as in Example I. 59 grams (59% of theory) of 2,2'-dihydroxy-4,4'-dimethoxybenzophenone were obtained which had a melting point of 133.2–137.1° C. The proportions of the salts used in the condensing and de-alkylating reagent are as follows:

| | Percent |
|---|---|
| Sodium bromide | 15 |
| Potassium chloride | 9 |
| Aluminum chloride | 76 |

EXAMPLE IV

To 480 grams of ethylene chloride were added 34 grams of sodium chloride. After cooling to 5° C., 140 grams of aluminum chloride were added. The charge was heated to reflux for a few minutes in order to obtain a solution, and then cooled to 0° C. 100 grams of 1,3-dimethoxybenzene were added and 42 grams of phosgene passed through at 0°–5° C. The charge was slowly raised to and maintained at 67° C. for about 16 hours, and then finished as in Example I. 58 grams (58% of theory) of 2,2'-dihydroxy-4,4'-dimethoxybenzophenone having a melting point of 127–133.4° C. were obtained.

The proportions of the salts in the two-component reagent are as follows:

| | Percent |
|---|---|
| Sodium chloride | 19 |
| Aluminum chloride | 81 |

EXAMPLE V

Example I was repeated with the exception that the three-component condensing and de-alkylating reagent was replaced by a mixture consisting of 16 grams of sodium chloride, 13.5 grams of potassium chloride and 112 grams of aluminum chloride. 56 grams (56% of theory) of 2,2'-dihydroxy-4,4'-dimethoxybenzophenone were obtained, having a melting point of 133.4–135.2° C.

The proportions of the salts used in the condensing and de-alkylating reagent are as follows:

| | Percent |
|---|---|
| Sodium chloride | 8.7 |
| Potassium chloride | 13.8 |
| Aluminum chloride | 78 |

EXAMPLE VI

Example II was repeated with the exception that the condensing and de-alkylating agent was replaced by 24 grams of sodium chloride, 21 grams of potassium chloride and 168 grams of aluminum chloride. 52 grams (52% of theory) of 2,2'-dihydroxy-4,4'-dimethoxybenzophenone were obtained with a melting point of 128–134.8° C.

The proportions of the salts in the condensing and de-alkylating reagent are as follows:

| | Percent |
|---|---|
| Sodium chloride | 11 |
| Potassium chloride | 11 |
| Aluminum chloride | 78 |

EXAMPLE VII

Example I was repeated with the exception that 100 grams of 1,3-dimethoxybenzene were replaced by 120 grams of 1,3-diethoxybenzene. A tan colored product was obtained which had U. V. absorption properties similar to the product obtained from 1,3-dimethoxybenzene. Its melting point was 120.6–122.4° C.

EXAMPLE VIII

Example I was repeated with the exception that 100 grams of 1,3-dimethoxybenzene were replaced by 140 grams of 1,3-diisopropoxybenzene. The tan colored product had U. V. absorption properties similar to the product obtained from 1,3-dimethoxybenzene.

EXAMPLE IX

Example I was repeated with the exception that 100 grams of 1,3-dimethoxybenzene were replaced by 160 grams of 1,3-diisobutoxybenzene. The product had properties commensurate with those of the product obtained from 1,3-dimethoxybenzene.

EXAMPLE X

Example I was repeated with the exception that 100 grams of 1,3-dimethoxybenzene were replaced by 179 grams of 1,3-diisoamyloxybenzene. The product had properties commensurate with those of the product obtained from 1,3-dimethoxybenzene.

EXAMPLE XI

Example I was again repeated with the exception that the condensing and de-alkylating reagent was replaced by a melt consisting of 20 grams of sodium chloride, 35 grams of sodium iodide and 140 grams of aluminum chloride. A commensurate product was obtained.

The proportions of the salt in the melt of the condensing and de-alkylating reagent are approximately as follows:

|  | Percent |
|---|---|
| Sodium chloride | 10 |
| Sodium iodide | 18 |
| Aluminum chloride | 72 |

EXAMPLE XII

Example I was again repeated with the exception that 17.5 grams of potassium chloride were replaced by 50 grams of potassium bromide prior to mixing and melting. A commensurate product was obtained.

The proportions of the salts in the condensing and de-alkylating reagent are as follows:

|  | Percent |
|---|---|
| Sodium chloride | 11 |
| Potassium bromide | 23 |
| Aluminum chloride | 66 |

EXAMPLE XIII

To 400 cc. of ethylene dichloride was added 20 grams of sodium chloride, 17.5 grams potassium chloride and 140 grams of aluminum chloride. The charge was stirred for one-half hour and then cooled to 0° C. To this was added 100 grams of 1,3-dimethoxybenzene. At 0° C., 41 grams of phosgene gas were passed through. The charge was then heated to the boiling point and held under reflux for 10 hours. It was then finished as in Example I. 61 grams (61% of theory) of 2,2'-dihydroxy-4,4'-dimethoxybenzophenones were obtained which had a melting point of 130.6–134.4° C.

The proportions of the salts in the condensing and de-alkylating reagent were the same as in Example I.

EXAMPLE XIV

Example I was again repeated with the exception that the salt mixture prior to melting was replaced by the following:

|  | Percent |
|---|---|
| Sodium chloride | 11 |
| Potassium bromide | 23 |
| Aluminum chloride | 66 |

EXAMPLE XV

Example V was repeated, employing instead of the sodium chloride-potassium chloride-aluminum chloride mixture, 112 grams of aluminum chloride. A product (55 grams) was obtained which had a wide melting range, from 65–95° C., and was quite dark in color.

From the foregoing examples it becomes clearly evident that the replacement of the very active aluminum chloride by a mixture of salts containing aluminum chloride, controlled di-de-alkylation is obtained, yielding a product of a high degree of purity. In addition, it is not necessary to employ absolute proportions of the eutectic mixtures comprising the condensing and de-alkylating reagents. There can be a very wide variation within certain limits as previously noted. Moreover, the sodium chloride may be substituted in part or entirely by sodium bromide or sodium iodide, and the potassium chloride by potassium iodide or potassium bromide.

We claim:

1. The process of preparing 2,2'-dihydroxy-4,4'-dialkoxybenzophenones which comprises first condensing a 1,3-dialkoxybenzene with phosgene at a temperature ranging between 0° and 10° C., in the presence of an inert solvent-diluent and in the presence of reagent mixture selected from the group consisting of a two-component mixture of 15–40% by weight of a sodium halide and 60–85% by weight of aluminum chloride, and a three-component mixture consisting of 5–16% by weight of a sodium halide, 5–25% by weight of a potassium halide and 599–90% by weight of aluminum chloride, said two- and three-component mixture being employed in the range of 140–215 parts by weight per 100–180 parts by weight of said 1,3-dialkoxybenzene, then raising and holding the temperature between 45°–85° C. to dealkylate the condensation product, and isolating a 2,2'-dihydroxy-4,4'-dialkoxybenzophenone.

2. The process according to claim 1 wherein the 1,3-dialkoxybenzene is 1,3-dimethoxybenzene.

3. The process according to claim 1 wherein the 1,3-dialkoxybenzene is 1,3-diethoxybenzene.

4. The process according to claim 1 wherein the 1,3-dialkoxybenzene is 1,3-diisopropoxybenzene.

5. The process according to claim 1 wherein the 1,3-dialkoxybenzene is 1,3-diisobutoxybenzene.

6. The process according to claim 1 wherein the 1,3-dialkoxybenzene is 1,3-diisoamyloxybenzene.

References Cited in the file of this patent

UNITED STATES PATENTS

| 2,686,812 | Wynn et al. | Aug. 17, 1954 |
| 2,693,492 | Hoch | Nov. 2, 1954 |
| 2,694,729 | Wynn et al. | Nov. 16, 1954 |

OTHER REFERENCES

Thomas: Anhyd. Aluminum Chloride in Org. Chem., pgs. 868–871 (1941).

UNITED STATES PATENT OFFICE
CERTIFICATE OF CORRECTION

Patent No. 2,853,522                                                September 23, 1958

Jason E. Dayan et al.

It is hereby certified that error appears in the printed specification of the above numbered patent requiring correction and that the said Letters Patent should read as corrected below.

Column 6, line 35, for "599-90%" read -- 59-90% --.

Signed and sealed this 23rd day of December 1958.

(SEAL)

Attest:

KARL H. AXLINE
Attesting Officer

ROBERT C. WATSON
Commissioner of Patents